(12) United States Patent
Stasinski et al.

(10) Patent No.: US 12,265,405 B2
(45) Date of Patent: Apr. 1, 2025

(54) ARRANGEMENT AND MANIPULATION SYSTEM, AND METHOD FOR MANIPULATING THE FLOW OF A FLUID

(71) Applicant: Faurecia Autositze GmbH, Hannover (DE)

(72) Inventors: Tomasz Stasinski, Dzierzoniow (PL); Piotr Ceglarek, Katowice (PL); Rafal Strok, Walbrzych (PL)

(73) Assignee: Faurecia Autositze GmbH, Hannover (DE)

( * ) Notice: Subject to any disclaimer, the term of this patent is extended or adjusted under 35 U.S.C. 154(b) by 288 days.

(21) Appl. No.: 18/064,399

(22) Filed: Dec. 12, 2022

(65) Prior Publication Data

US 2023/0184266 A1    Jun. 15, 2023

(30) Foreign Application Priority Data

Dec. 15, 2021 (DE) .......................... 102021133288.5

(51) Int. Cl.
*G05D 16/20*        (2006.01)
*B60N 2/90*         (2018.01)
(Continued)

(52) U.S. Cl.
CPC ......... *G05D 16/2066* (2013.01); *B60N 2/914* (2018.02); *F16K 11/022* (2013.01);
(Continued)

(58) Field of Classification Search
CPC .......... G05D 16/2066; G05D 16/0404; G05D 16/0644; B60N 2/914; B60N 2/0224;
(Continued)

(56) References Cited

U.S. PATENT DOCUMENTS 3,771,552 A * 11/1973 Watanabe ............ G05D 16/208
137/565.13
4,254,790 A *  3/1981 Eriksson ............ G05D 16/0404
137/100
(Continued)

FOREIGN PATENT DOCUMENTS

EP    1276651 A1    1/2003
EP    1377807 A1    1/2004
EP    2964986 A1    1/2016

*Primary Examiner* — Minh Q Le
(74) *Attorney, Agent, or Firm* — Laurence P. Colton; Smith Tempel Blaha LLC

(57) ABSTRACT

An arrangement for manipulating the flow of a fluid into a fluid actuator, preferably of a seat, has a base body having an opening designed to introduce the fluid into the base body, and at least one further opening provided for forwarding or discharging the fluid introduced into the base body. Means for producing and/or interrupting a fluid-conducting connection between the openings are provided. The means comprise such additional means that can be charged with a pressure of the fluid to be conducted and are designed such that, in a first pressure range of the fluid, the fluid entering the base body from the fluid actuator is discharged via one of the openings from the base body to the surroundings and, in a second pressure range of the fluid that is higher than the first pressure range, the fluid introduced into the base body is introduced into the fluid actuator.

14 Claims, 4 Drawing Sheets

(51) Int. Cl.
*F16K 11/02* (2006.01)
*G05D 16/04* (2006.01)
*G05D 16/06* (2006.01)
B60N 2/02 (2006.01)
B60N 2/16 (2006.01)
B60N 2/66 (2006.01)
F15B 13/02 (2006.01)
F15B 15/10 (2006.01)
F15B 15/18 (2006.01)
F16K 11/10 (2006.01)
F16K 31/126 (2006.01)

(52) U.S. Cl.
CPC ..... *G05D 16/0404* (2019.01); *G05D 16/0644* (2013.01); *B60N 2/02* (2013.01); *B60N 2/0224* (2013.01); *B60N 2/1655* (2013.01); *B60N 2/665* (2015.04); *F15B 13/02* (2013.01); *F15B 13/027* (2013.01); *F15B 15/10* (2013.01); *F15B 15/18* (2013.01); *F16K 11/10* (2013.01); *F16K 31/1262* (2013.01)

(58) Field of Classification Search
CPC ........ B60N 2/1655; B60N 2/02; B60N 2/665; F16K 11/022; F16K 11/10; F16K 31/1262; F15B 13/02; F15B 13/027; F15B 15/10; F15B 15/18
USPC .......................................................... 137/863
See application file for complete search history.

(56) References Cited

U.S. PATENT DOCUMENTS

| | | | | |
|---|---|---|---|---|
| 4,491,364 | A | * | 1/1985 | Hattori .................. B60N 2/914 297/284.6 |
| 4,570,676 | A | * | 2/1986 | Nishio ..................... F16K 11/24 297/284.6 |
| 4,840,347 | A | | 6/1989 | Ariizumi |
| 4,938,528 | A | * | 7/1990 | Scott ....................... A47C 7/467 297/284.6 |
| 10,781,808 | B2 | * | 9/2020 | Kawamura .......... A61B 5/0235 |
| 2009/0153269 | A1 | | 6/2009 | Ono |
| 2015/0034847 | A1 | * | 2/2015 | Kotani .................. F04B 45/047 251/57 |
| 2017/0106982 | A1 | * | 4/2017 | John ................... B64D 11/0647 |
| 2017/0274801 | A1 | * | 9/2017 | Shibata .................... B60N 2/02 |
| 2020/0103047 | A1 | * | 4/2020 | Beuschel ............... F16K 31/025 |
| 2022/0325815 | A1 | * | 10/2022 | Beuschel ............... B60N 2/665 |
| 2024/0044413 | A1 | * | 2/2024 | Teschke ................ F16K 11/168 |

* cited by examiner

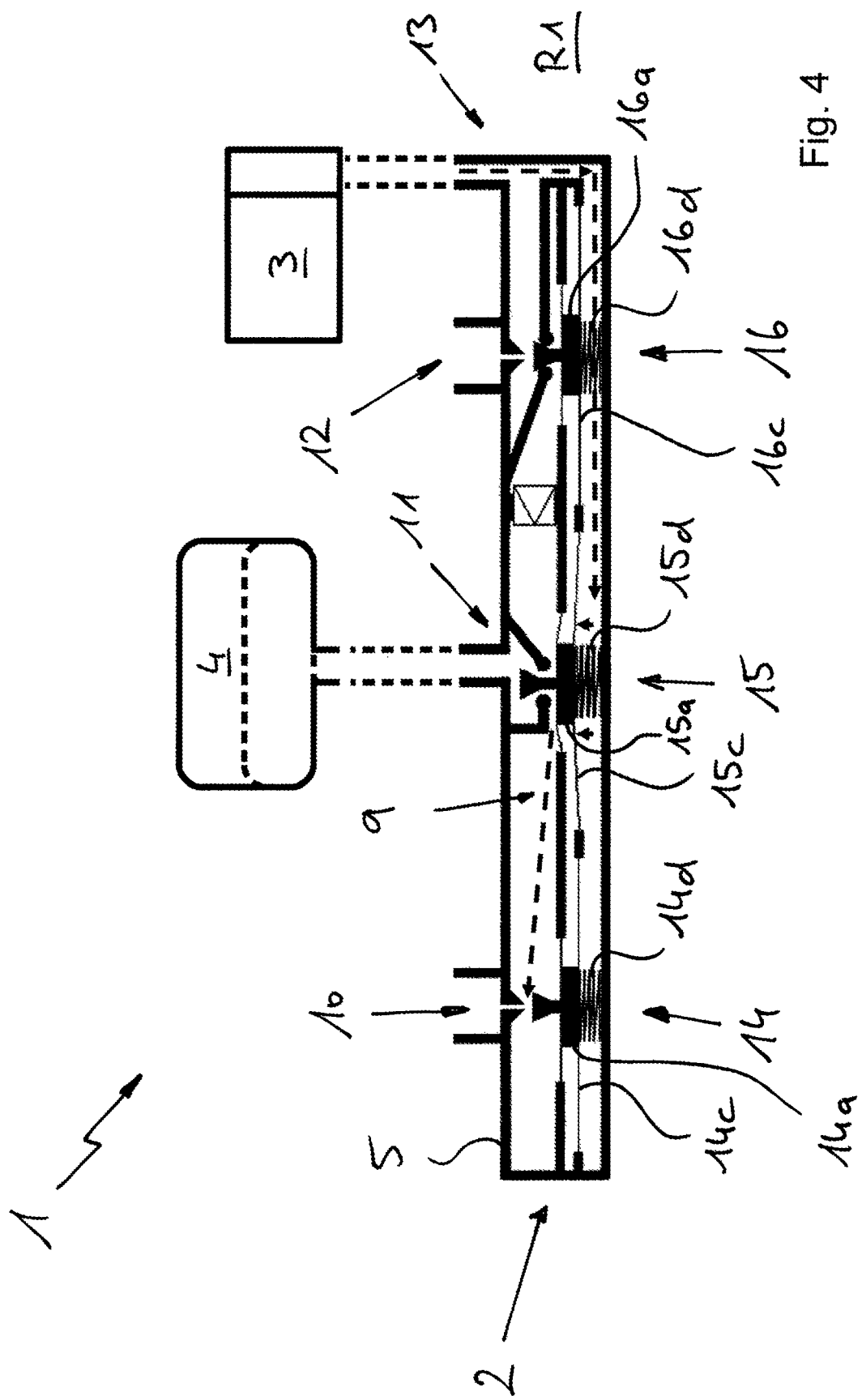

ARRANGEMENT AND MANIPULATION SYSTEM, AND METHOD FOR MANIPULATING THE FLOW OF A FLUID

CROSS REFERENCE TO RELATED APPLICATIONS

This patent application claims the benefit of and priority on German Patent Application No. 10 2021 133 288.5 having a filing date of 15 Dec. 2021.

BACKGROUND OF THE INVENTION

Technical Field

The invention relates to an arrangement for manipulating the flow of a fluid, preferably for a fluid actuator of a seat or motor vehicle seat, into and out of a fluid actuator, preferably of a seat, wherein the arrangement comprises a base body having an opening designed to introduce the fluid into the base body, and at least one further opening provided for forwarding or discharging the fluid introduced into the base body, wherein means are provided for establishing and/or interrupting a fluid-conducting connection between the openings. Furthermore, the invention relates to a manipulation system having such an arrangement, as well as a pump that is connected in a fluid-conducting manner to a fourth opening of the base body of the arrangement, wherein the fluid actuator, preferably an expansion body, is connected in a fluid-conducting manner to a second opening of the base body of the arrangement. Finally, the invention also relates to a method for manipulating the flow of a fluid with such a manipulation system, wherein at least one means, preferably a valve, provided for establishing and/or interrupting a fluid-conducting connection between the openings of the base body of the arrangement is charged with the fluid to be conducted and is actuated depending on a pressure value of the fluid that can be adjusted via the pump.

Prior Art

Motor vehicle seats that can be arranged in vehicles sometimes have adjustment functions beyond their variable inclination and height. These usually allow comfort-increasing ergonomic adjustment of the seat regions coming into contact with a person. Such a functional device can be, for example, a lumbar support arranged in the seatback part. Actuators enable the movements necessary for this purpose, wherein their manipulation can take place purely electrically or with a fluid pressure. Fluid actuators require only a small installation space, wherein their at least one hollow chamber that can be filled with fluid can be charged with hydraulic or pneumatic pressure. A fluid actuator whose volume varies is also referred to as a "bladder" or expansion body.

The fluid pressure necessary for this is built up via a pump that can be driven by a motor, which is usually electric, or via a compressor. This pump or compressor is usually situated in or outside the seat, for example. The fluid-conducting connection to the individual fluid actuators can then be implemented via flexible hoses. In order to be able to control the individual fluid actuators separately from one another, elaborate and correspondingly cost-intensive valve arrangements are thereby sometimes necessary. Such functional devices are thereby hardly used in the entry-level market, and are there also offered only rarely as accessories.

From U.S. Pat. No. 4,840,347 A, a pneumatically operating valve is known that has a base body having a channel provided for the passage of a fluid. The channel can be changed between a closed and an open state via a closure member. For this purpose, the closure member is arranged at the end of a linearly displaceable piston rod, wherein the piston rod can be driven by two pistons placed in a respective one of two spaces of the base body that are separated from one another. For the passage or shut-off of the fluid, the surfaces of the respective pistons, which pistons are sealed off with respect to their associated space and guided movably therein, said surfaces facing away from one another, are charged with air pressure in order to achieve the desired actuating state of the closure member.

EP 1 377 807 A1 discloses a control module for regulating the flow of a chemically corrosive or ultra-pure fluid through a channel formed in its base body. Two bores placed at a distance from one another and delimited from one another by a partition wall are arranged within the base body such that they divide the channel. The bores, which are inasmuch connected in a fluid-conducting manner to the channel, are respectively sealed via a membrane with respect to the channel, wherein the two membranes are each coupled to a pressure sensor. A fluid sensor is located within a bypass connecting the bores to one another in a fluid-conducting manner behind the membranes. The fluid penetrating into the bypass in the event of a leakage of at least one membrane can hereby be detected and correspondingly signaled. Via a constriction of the channel, said constriction being situated in the region of the partition wall, the flow within the channel is modified while a pressure difference detectable by the pressure sensor situated downstream and upstream of the constriction, in order to be able to both perform the self-calibration of a controller and calculate the flow rate of the fluid within the channel. A control valve situated downstream of the two pressure sensors corresponds to the channel such that the fluid speed can be set. For this purpose, the control valve has an electrically or pneumatically operating actuating device which interacts with a membrane that influences the fluid flow by changing the cross section through which flow can occur.

With EP 1 276 651 A1, a brake pressure control device has been known that is designed to reduce the forces resulting from the input pressure and the output pressure and acting on a valve body of its return valve. The valve body is an operating piston having a first operating piston side and a second operating piston side. During operation, the first operating piston side is loaded with brake operation valve pressure or brake cylinder pressure. In contrast, the second operating piston side is charged with brake cylinder pressure only on a first partial surface, whereas a second partial surface of the second operating piston side is subject to the brake operation valve pressure. The pressures acting on both sides of the operating piston cancel each other out. A pressure selection device of the brake pressure control device, said pressure selection device having a plurality of membrane valves, ensures that, on the one hand, the brake operation valve pressure or brake cylinder pressure having the higher value and, on the other hand, the brake operating valve pressure or brake cylinder pressure having the lower value are available separately from one another.

To be learned from US 2009/0153269 A1 is a device for supplying the print head of a printer with printing ink stored in a cartridge. The device has a base body having two parts that are connected to one another while integrating an elastic sealing element, and thereby form a channel provided for transporting the printing ink. The base body has three spaces, of which the total volume of two small spaces corresponds to the volume of the large space situated therebetween. The sealing element thereby extends through the individual spaces such that these are each separated into two chambers. The regions of the sealing element situated in the spaces are held in a normal position via spring elements. The region of the sealing element separating the large space can be deflected out of its normal position by means of negative pressure such that a pumping movement can be generated, via which the chamber of the large space, which chamber is connected in a fluid-conducting manner to the channel, can suction a quantity of printing ink and forward it via the spring-loaded restoring movement of the sealing element when the negative pressure drops.

A microvalve for fluids that can be used in medicine arises from EP 2 964 986 A1. The microvalve comprises a first valve element that has a flexible part and a rigid part. Furthermore, a second valve element is provided that can be brought into a sealing contact with the first valve element in order to control a fluid flow through the passage of the microvalve. The actuation of these valve arrangements takes place either electrically, for example piezoelectrically, or pneumatically. Most of all, its pneumatic operation sometimes requires complex systems in order to ensure the diversion of the switching air necessary for actuation, which switching air is required in addition to the fluid to be controlled.

BRIEF SUMMARY OF THE INVENTION

Against this background, the object of the present invention is to further develop an arrangement as well as a correspondingly equipped manipulation system to the effect that these enable an embodiment that makes do with only a few components and is overall simple to control. Furthermore, a method for simple manipulation of the flow of a fluid with such a manipulation system is to be achieved.

The object is achieved by an arrangement for manipulating the flow of a fluid into and out of a fluid actuator, preferably of a seat, wherein the arrangement comprises a base body having an opening designed to introduce the fluid into the base body, and at least one further opening provided for forwarding or discharging the fluid introduced into the base body, wherein means are provided for establishing and/or interrupting a fluid-conducting connection between the openings, characterized in that the means comprise such means that can be charged with a pressure of the fluid to be conducted and are designed such that, in a first pressure range of the fluid, the fluid entering the base body from the fluid actuator is discharged via one of the openings from the base body to the surroundings and, in a second pressure range of the fluid that is higher than the first pressure range, the fluid introduced into the base body is introduced into the fluid actuator.

The object is further achieved by a manipulation system comprising an arrangement as disclosed herein, as well as a pump that is connected in a fluid-conducting manner to a fourth opening of the base body of the arrangement, wherein the fluid actuator, preferably an expansion body, is connected in a fluid-conducting manner to a second opening of the base body of the arrangement.

The object is still further achieved ay a method for manipulating the flow of a fluid with a manipulation system as disclosed herein, wherein at least one means, preferably a valve, provided for establishing and/or interrupting a fluid-conducting connection between the openings of the base body of the arrangement is charged with the fluid to be conducted and is actuated depending on a pressure value of the fluid that can be adjusted via the pump Advantageous embodiments are found in the respective dependent claims.

According to the invention, an arrangement for manipulating the flow of a fluid into and out of a fluid actuator is provided, which arrangement, in addition to the fluid actuator, comprises a base body of the arrangement having an opening designed for the introduction the fluid into said base body; and at least one further opening provided for forwarding and/or discharging the fluid introduced into the base body; as well as means for establishing and/or interrupting a fluid-conducting connection between the openings. According to the invention, it is thereby provided that the means comprise such means that can be charged with a pressure of the fluid to be conducted and are designed such that, in a first pressure range of the fluid, the fluid entering into the base body from the fluid actuator is discharged via one of the openings from the base body into the surroundings; and, in a second pressure range of the fluid that is higher than the first pressure range, the fluid introduced into the base body is introduced into the fluid actuator.

According to a preferred embodiment, the means are a plurality of valves that comprise at least one first valve that is open in its normal position, and a second valve that is closed in its normal position. The valves can thereby be charged with a pressure of the fluid to be conducted, and are designed such that, in a first pressure range of the fluid, the first valve remains in its open normal position and the second valve is transitioned from its closed normal position to an open switching position. In contrast, in a second pressure range of the fluid that is higher relative to the first pressure range, the second valve remains in its open switching position while the first valve is transitioned from its open normal position into a switching position closed in relation thereto.

The advantage resulting from is to be seen in that the arrangement according to the invention makes do without a control pressure that is additionally to be built up and conducted via further components. Rather, the flow of the fluid to be conducted that is required in any event is simultaneously used to control the means, preferably the valves. By changing its pressure value, the means react accordingly in order to regulate or prevent the flow of the fluid through the base body of the valve arrangement in the desired manner.

According to a preferred development of the basic idea of the invention, the first valve can be designed to open and close the first opening provided for discharging the fluid introduced into the base body. For this purpose, the first opening can be in contact, for example directly or via a sound damper, with the atmosphere surrounding the valve arrangement, such that the fluid can escape into said atmosphere if necessary.

According to an advantageous embodiment, the second valve can be designed to open and close a second opening provided for forwarding the fluid introduced into the base body. Via a corresponding fluid-conducting connection of the second opening, for example to a fluid actuator, the fluid that can be introduced into the base body can thus pass, at least indirectly, through the second opening into a hollow chamber of the fluid actuator in order to thus change its size, i.e., its volume.

The invention provides that the means can comprise a third valve that can be charged with the pressure of the fluid to be conducted, which third valve is then designed to open and close a third opening provided for discharging the fluid introduced into the base body. Its embodiment can preferably be selected such that the third valve remains in a first switching position, opening the third opening, given a pressure value of the fluid below the first pressure range or in the first pressure range, whereas it is transitioned from its first switching position into a second switching position that closes the third opening given a pressure value of the fluid lying in the second pressure range.

According to a preferred development of the arrangement according to the invention, its base body can have a space in the sense of a cavity which is divided by a separating element into a first chamber and into a second chamber. The first chamber can then be permanently connected in a fluid-conducting manner to the fourth opening designed to introduce the fluid into the base body. Furthermore, at least the first opening can then be connected in a fluid-conducting manner to the second chamber via the associated first valve, and the second opening can be connected in a fluid-conducting manner, at the same time or alternately, to the second chamber by the second valve associated therewith.

In this context, it is considered to be particularly advantageous if, in the first switching position of the third valve, the first chamber and the second chamber are separated from one another in a fluid-tight manner, whereas in the second switching position of the third valve, the first chamber and the second chamber are connected to one another in a fluid-conducting manner.

In principle, at least one of the valves can be held by a spring element in one of its possible positions. Depending on the embodiment and arrangement, at least a part of the valve can thus be pulled or pressed into one of its positions by the spring element. In any event, given a pressure value of the fluid in the first pressure range and/or in the second pressure range, it is provided that the valve can then be changed to its other possible position only against the restoring force of the spring element acting thereon.

In conjunction with the separation of the space into two chambers, it is considered advantageous if at least one of the valves has a valve body that is movably mounted in the separating element by a retaining diaphragm that seals the two chambers against one another. On the one hand, the retaining diaphragm thereby fulfills the task of a guided movable mounting of the valve body, while it simultaneously shields the two chambers against one another with respect to the exchange of fluid. The valve body of at least one valve can then preferably be coupled to the associated spring element in a suitable manner.

In this context, it is regarded as particularly advantageous if the valve body is coupled to a drive diaphragm arranged within the first chamber. The drive diaphragm thereby has a surface that is larger relative to the retaining diaphragm, which surface can be charged with the pressure of the fluid to be conducted. In this way, despite the same pressure value for the fluid in both chambers, a greater load is generated on the side of the drive diaphragm, which load is based on the force resulting from the larger diaphragm area. In other words, the values of the forces loading the movable valve body in opposite directions from the two chambers are thus unequal, wherein the force resulting from the first chamber is always greater than the force resulting from the second chamber. In conjunction with the possible arrangement of spring elements, a correspondingly balanced mounting of the valve body can thus be achieved, wherein the sum or difference of the rectified forces of the spring element and one of the two diaphragm surfaces can preferably correspond to the value of the oppositely acting force of the other diaphragm surface.

In conjunction with the separation of the space into two chambers, the invention provides that the arrangement can have a check valve arranged within the second chamber. The check valve is designed to allow the flow of the introduced into the base body via the fourth opening and through the third valve—located in its second switching position—into the second chamber toward the second valve. In contrast, the check valve also then ensures that a backflow from the second chamber toward the fourth opening is blocked.

The now proposed arrangement according to the invention enables an embodiment that requires only a few components and is simple to control overall. By using the pressure that is present or can be generated via the fluid to be conducted, an extremely minimalistic structure of a 2-way valve is possible with simultaneous full controllability. Via corresponding combination of the arrangement with at least one further such arrangement, multi-way embodiments beyond this are also conceivable.

Furthermore, the invention relates to a manipulation system comprising an arrangement according to the invention as described above, as well as a pump and the fluid actuator, which is preferably an expansion body. The pump is thereby connected in a fluid-conducting manner to a fourth opening of the base body of the arrangement, while the expansion body is connected in a fluid-conducting manner to a second opening of the base body of the arrangement.

Most of the advantages resulting from this have already been explained in more detail in conjunction with the presentation of the arrangement according to the invention, so that, in order to avoid repetition, reference is made at this point to the corresponding explanations in this respect. Beyond the property of conveying the fluid, the pump can simultaneously be used to control the valves via a variation of the respective pressure value of the fluid. In this way, an extremely simple change in the size of the fluid actuator can be achieved with only a few means, and that is thereby fully controllable.

Thanks to the embodiment of the arrangement according to the invention and/or of the manipulation system according to the invention requiring little installation space, a simple integration, for example into a seat, for example a motor vehicle seat, can be realized.

Finally, the invention is also directed to a method that serves to manipulate the flow of a fluid with the described manipulation system according to the invention. This provides that at least one means, preferably a valve, provided for establishing and/or interrupting a fluid-conducting connection between the openings of the base body of the arrangement is charged with the fluid to be conducted and is actuated depending on a pressure value of the fluid that can be adjusted via the pump.

The advantages resulting from this have already been explained in more detail in conjunction with the presentation of the arrangement and of the manipulation system, so that, in order to avoid repetition, reference is made at this point to the corresponding explanations in this respect.

In order to forward the fluid, introduced into the base body of the arrangement via the pump through a fourth opening of said base body of the arrangement, into the fluid actuator, it is preferably provided that the pressure of the fluid can be increased by increasing the power of the pump until a pressure value within a second pressure range is reached. A first opening of the base body is hereby closed by the first valve, and a third opening of the base body is closed by a third valve with simultaneous establishment of a fluid-conducting connection between the two chambers of the base body, while a second valve is opened by the fluid that is then applied to said second valve at a pressure within the second pressure range, and the fluid thus flows through the one opening of the base body into the fluid actuator.

In order to hold the fluid introduced into the fluid actuator, it is regarded as advantageous if the first opening of the base body is opened by the first valve and both the second opening of the base body, which is connected in a fluid-conducting manner to the fluid actuator, and the third opening of the base body are closed by the third valve with simultaneous interruption a fluid-conducting connection between the two chambers of the base body. For this purpose, the pressure of the fluid is lowered, by a power reduction of the pump, to a pressure value below a first pressure range.

In order to discharge the fluid present in the fluid actuator at least partially via the first opening of the base body, a preferred measure provides that both the first valve and the third valve of the third opening are opened as required with simultaneous interruption of a fluid-conducting connection between the two chambers of the base body, while the second valve of the second opening of the base body that is connected in a fluid-conducting manner to the fluid actuator is opened. "If necessary" hereby means that the discharge can either take place immediately after the forwarding of the fluid into the fluid actuator, or the fluid is held within the fluid actuator. In the first instance, the pump is still active such that the pressure value of the fluid lies within the second pressure range, which is higher than the first pressure range, such that at least some of the valves hereby controlled must be brought back into their normal position in that the pressure of the fluid is lowered by a power reduction of the pump from a pressure value in the second pressure range to a pressure value in the first pressure range. In the second instance, these valves are—due to a standstill or an activity of the pump below the pressure value for building up a pressure value within the first pressure range—already in their normal position, so that the pressure of the fluid is raised to a pressure value in the first pressure range by increasing the power of the pump.

BRIEF DESCRIPTION OF THE DRAWINGS

The invention is explained in more detail below using an exemplary embodiment illustrated only schematically in the drawings. In the drawings:

FIG. 4 shows the manipulation system of FIG. 1 to FIG. 3 in a position of its components, which position serves for discharging the fluid producing the inflated state of its fluid actuator, in an otherwise identical manner of representation.

DETAILED DESCRIPTION FO PREFERRED EMBODIMENTS

Figure 1:
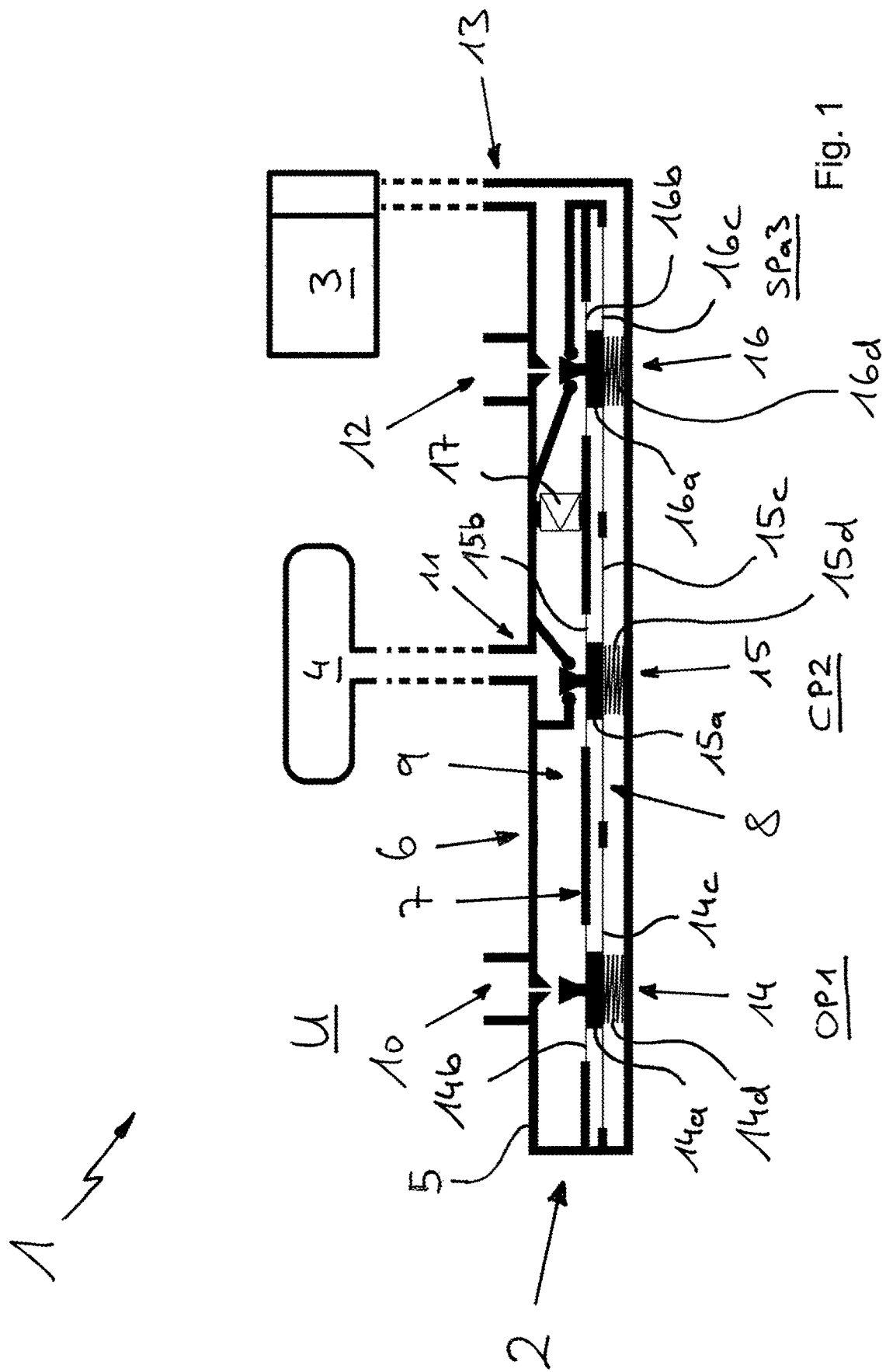
FIG. 1 shows a manipulation system according to the invention, having an arrangement according to the invention in a sectional representation.

FIG. 1 shows a manipulation system 1 according to the invention in a schematic side view. The manipulation system 1 comprises an arrangement 2 according to the invention as well as a pump 3 and a fluid actuator 4. The individual parts of the manipulation system 1 can be shown in section in order to illustrate at least the individual components of the arrangement 2 and their position.

The arrangement 2 has a base body 5 that has a space 6 that is divided into a first chamber 8 and into a second chamber 9 by—here purely by way of example—a separating element 7 designed in the form of a wall. Furthermore, the base body 5 has in total four openings 10-13, of which both the first opening 10, which is situated on the left with respect to the illustration in FIG. 1, and the third opening 12, arranged between the second opening 11 and fourth opening 13 successively situated to the right side of the first opening 10, connect the base body 5 to the environment U surrounding it. A first valve 14 is associated with the first opening 10, while a second valve 15 is associated with the second opening 11. The first valve 14 and the second valve 15 serve to selectively close or open the first opening 10 and the second opening 11. In contrast, a third valve 16 associated with the third opening 12 has a dual function described in more detail below. Each of the valves 14-16 has a valve body 14a-16a that is respectively movably mounted in the separating element 7 by a retaining diaphragm 14b-16b that seals the two chambers 8, 9 against one another. Furthermore, each of these valve bodies 14a-16a is coupled to a drive diaphragm 14c-16c arranged within the first chamber 8. As can be seen, each of these drive diaphragms 14c-16c has a larger area relative to the retaining diaphragm 14b-16b associated therewith. Finally, each valve 14-16 has a spring element 14d-16d, via which the respective associated valve body 14a-16a is loaded with a spring force. In the present instance, the design is, purely by way of example, selected in such a way that the individual spring elements 14d-16d exert a tensile force on the associated valve body 14a-16a.

An output of the pump 3 is connected in a fluid-conducting manner to the fourth opening 13 of the base body 5. In the present instance, the connection is indicated by broken black lines. Furthermore, the fluid actuator 4 is connected in a fluid-conducting manner to the second opening 11 of the base body 5. In the present instance, this connection is also indicated by broken black lines. A check valve 17 is arranged within the second chamber 9 of the base body 5.

Figure 2:
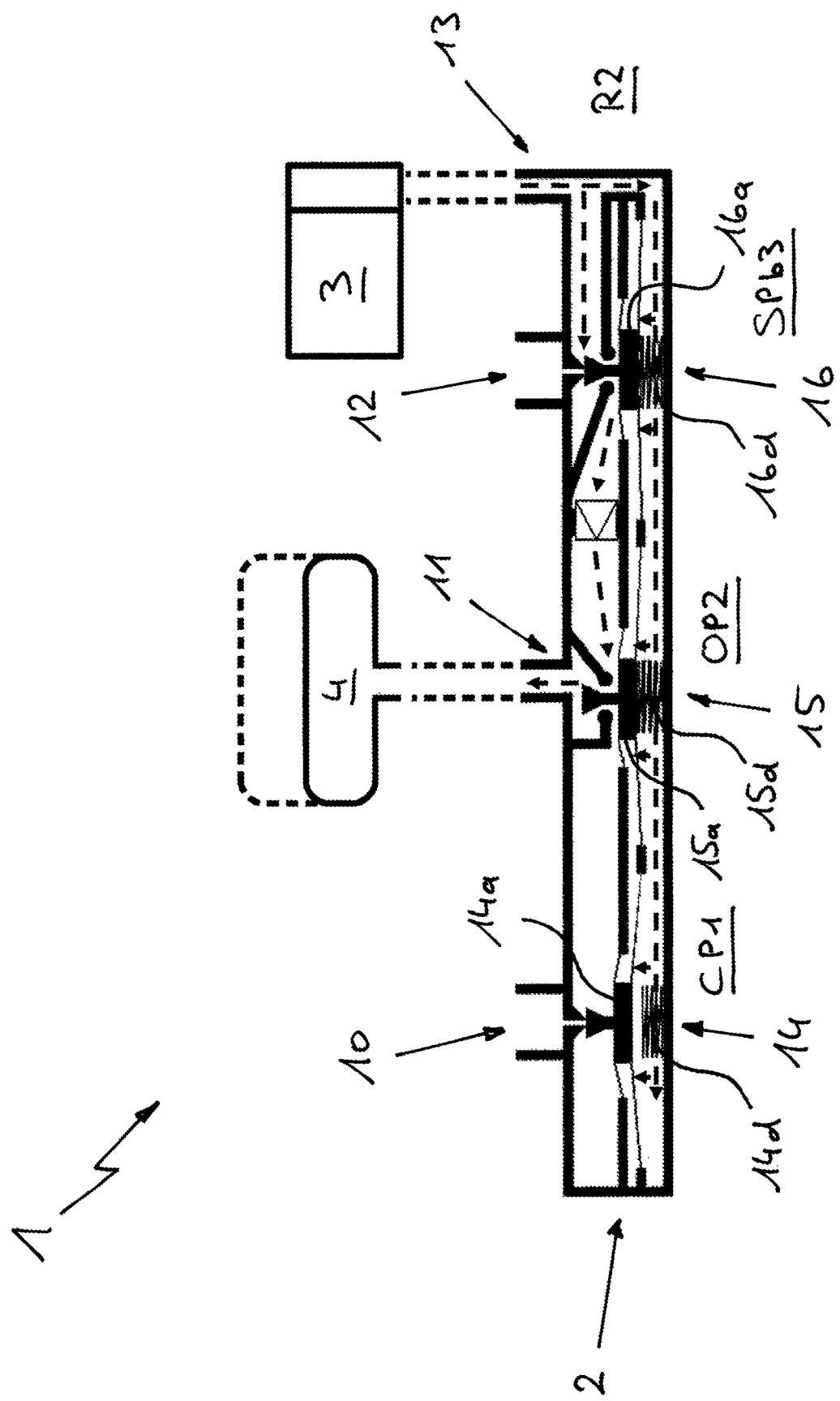
FIG. 2 shows the manipulation system from FIG. 1 in a position of the components of its arrangement, which position serves for at least partially inflating a fluid actuator, in the same manner of representation.

A position of the components of the arrangement 2, which position serves for at least partially inflating the fluid actuator 4, is to be learned from FIG. 2. For this purpose, fluid is introduced via the fourth opening 13 into the base body 5 in that the pump 3 has been activated (in a manner not shown in detail). The path of the fluid within the base body 5 is indicated by black arrows with broken lines. The fluid initially enters the first chamber 8, where it impinges on the surfaces of the individual drive diaphragms 14c-16c of each valve 14-16. The power of the pump 3 is thereby set so high that the fluid achieves a pressure value lying within a second pressure range R2. As a result of the forces resulting from the pressure on the surfaces of the individual drive diaphragms 14c-16c, these are all moved against the retaining force of the respective spring element 14d-16d.

Specifically, the first valve 14, which had previously been held in its normal position OP1 via its first spring element 14d, thereby holding open its associated first opening 10, was hereby transitioned into a switching position CP1 that closes the first opening 10. In other words, the first valve body 14a of the first valve 14 was hereby displaced from the normal position OP1, against the restoring force of the first spring element 14d, into the switching position CP1. In addition, the second valve 15, which had previously been held in its normal position CP2 via its spring element 15d, thereby holding closed its associated second opening 11, was transitioned into a switching position OP2 that opens the second opening 15. In other words, here as well the second valve body 15a was also displaced, against the restoring force of the second spring element 15d of the second valve 15, from the normal position CP2 into the switching position OP2. Finally, the third valve 16, which had previously been held in its first switching position SPa3 via its spring element 16d, thereby both holding open its associated third opening 12 and separating the first chamber 8 and the second chamber 9 from one another in a fluid-tight manner, was also transitioned into a second switching position SPb3 that closes the third opening 16 and connects the two chambers 8, 9 to one another in a fluid-conducting manner. In other words, the third valve body 16a was thereby displaced from the first switching position SPa3 into the second switching position SPb3 against the restoring force of the third spring element 16d of the third valve 16.

As a result, the fluid that is conveyed by the pump 3 and with its pressure causes the individual switching states of the valves 14-16 now passes further to the second valve 15 via the third valve 16, which, in its second switching position Spb3, connects the two chambers 8, 9 to one another, which second valve 15, due to its assumed switching position OP2, enables a relaying of the fluid into the fluid actuator 4 so that this is filled with fluid and expands accordingly (indicated by broken black lines).

Figure 3:
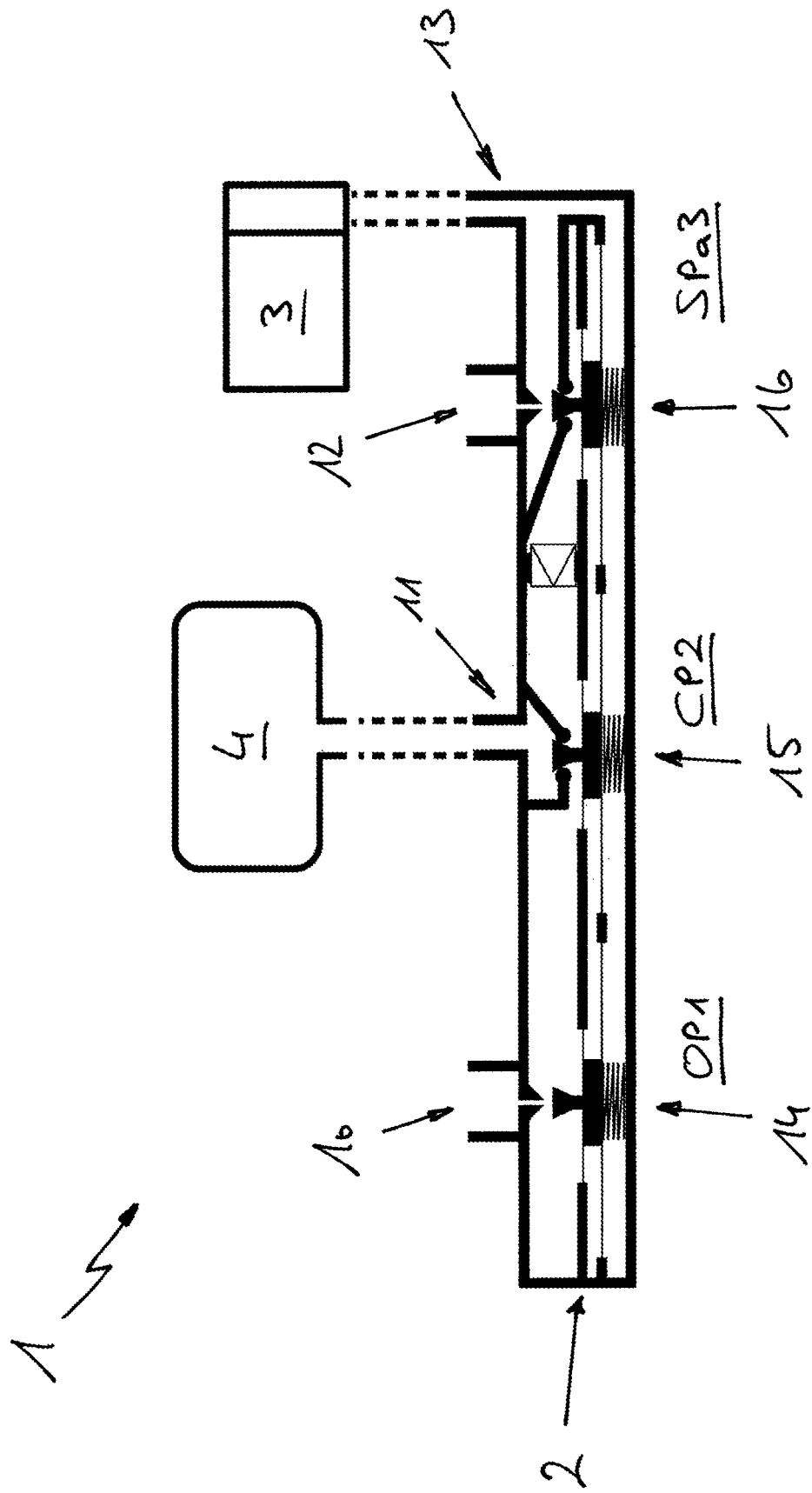
FIG. 3 shows the manipulation system of FIG. 1 and FIG. 2 in a position of its components which serves for maintaining the inflated state of the fluid actuator of said manipulation system, in an otherwise identical manner of representation.

FIG. 3 illustrates the position of the components of the valve arrangement 2, in which the fluid introduced into the fluid actuator 4 is held in said fluid actuator. For this purpose, the activity of the pump 3 was interrupted so that the fluid pressure on the drive diaphragms 14c-16c is eliminated insofar as that all valves 14-16 were transitioned back into their initial position via the associated spring element 14d-16d.

In principle, this position of the valves 14-16 can also be achieved in that the power of the pump 3 is reduced to such an extent that the fluid pressure continuing to act on the drive diaphragms 14c-16c is no longer sufficient to hold the valve bodies 14a-16a of the valves 14-16 against the respective restoring force of the associated spring element 14d-16d in its displaced position. For this purpose, a corresponding adaptation of the third opening 13, which is open in this position, is necessary in order to adapt the loss of fluid that hereby ensues to the necessary minimum.

As can be seen, the first valve 14 and the second valve 15 have now again assumed their respective normal position OP1, CP2, whereas the third valve 16 was again transitioned from its second switching position SPb3 into its first switching position SPa3. The normal position CP2 of the second valve 15 has the effect that the second opening 15 associated with it is closed, such that the fluid present in the fluid actuator 4 is held therein.

To be learned from FIG. 4 is the position of the components of the arrangement 2 in which the fluid introduced into the fluid actuator 4 is at least in part emptied out of said fluid actuator. For this purpose, the pump 3 was activated, wherein its power is set such that the pressure value of the fluid lies within a first pressure range R1 below the second pressure range R2. Due to a correspondingly lower restoring force of the second spring element 15d of the second valve 15 relative to the spring elements 14d, 16d of the first valve 14 and of the third valve 16, and/or a correspondingly smaller area of the second drive diaphragm 15c of the second valve 15 relative to the areas of the first drive diaphragm 14c and of the third drive diaphragm 16c of the first valve 14 and of the third valve 16, only the second valve body 15a of the second valve 15 is hereby displaced as a result, while the valve bodies 14a, 16a of the first valve 14 and of the third valve 16 remain in their normal position OP1 or first switching position SPa3. Through the second valve 15, which is thus open, the fluid arrives from the fluid actuator 4, via the second opening 11, into the second chamber 9 of the base body 5. Via the check valve 17, the path to the third valve 16 is blocked, whereas the path to the open first valve 14 is free, such that the fluid can escape at least in part into the surroundings U via the open first opening 10. As a result, the volume of the fluid actuator 4 decreases again (indicated by interrupted black lines).

LIST OF REFERENCE SIGNS 1 manipulation system
2 arrangement of 1
3 pump of 1
4 fluid actuator of 1
5 base body of 2
6 space in 5
7 separating element in 6
8 first chamber of 6
9 second chamber of 6
10 first opening of 5
11 second opening of 5
12 third opening of 5
13 fourth opening of 5
14 first valve of 2
14a first valve body of 14
14b first retaining diaphragm of 14
14c first drive diaphragm of 14
14d first spring element of 14
15 second valve of 2
15a second valve body of 15
15b second retaining diaphragm of 15
15c second drive diaphragm of 15
15d second spring element of 15
16 third valve of 2
16a third valve body of 16
16b third retaining diaphragm of 16
16c third drive diaphragm of 16
16d third spring element of 16
17 check valve of 2
CP1 closed switching position of 14
CP2 closed normal position of 15
OP1 open normal position of 14
OP2 open switching position of 15
SPa3 first switching position of 16
SPb3 second switching position of 16
R1 first pressure range <R2
R2 second pressure range >R1
U surroundings

The invention claimed is:

1. An arrangement (2) for manipulating the flow of a fluid into and out of a fluid actuator (4), preferably of a seat, wherein the arrangement (2) comprises a base body (5) having an opening (13) designed to introduce the fluid into the base body (5), and at least one further opening (10-12) provided for forwarding or discharging the fluid introduced into the base body (5), wherein means are provided for establishing and/or interrupting a fluid-conducting connection between the openings (10-13),
wherein the means for establishing and/or interrupting a fluid-conducting connection between the openings (10-13) comprise such additional means (14, 15) that can be charged with a pressure of the fluid to be conducted and are designed such that, in a first pressure range (R1) of the fluid, the fluid entering the base body (5) from the fluid actuator (4) is discharged via one of the openings (10) from the base body (5) to the surroundings and, in a second pressure range (R2) of the fluid that is higher than the first pressure range (R1), the fluid introduced into the base body (5) is introduced into the fluid actuator (4), wherein the additional means comprise a first valve (14) that is open in its normal position (OP1), and a second valve (15) that is closed in its normal position (CP2), wherein the valves (14, 15) can be charged with a pressure of the fluid to be conducted and are designed such that, in a first pressure range (R1) of the fluid, the first valve (14) remains in its open normal position (OP1) and the second valve (15) is transitioned from its closed normal position (CP2) into an open switching position (OP2), whereas, in a second pressure range (R2) of the fluid that is higher than the first pressure range (R1), the second valve (15) remains in the open switching position (OP2) or is transitioned into said open switching position, and the first valve (14) is transitioned from its open normal position (OP1) into a switching position (CP1) that is closed in relation to said open normal position.

2. The arrangement (2) according to claim 1, wherein the first valve (14) is designed to open and close the first opening (10) provided for discharging the fluid introduced into the base body (5).

3. The arrangement (2) according to claim 2, wherein the second valve (15) is designed to open and close a second opening (11) provided for forwarding the fluid introduced into the base body (5).

4. The arrangement (2) according to claim 3, wherein the means comprise a third valve (16) that can be charged with the pressure of the fluid to be conducted and that is designed to open and close a third opening (12) provided for discharging the fluid introduced into the base body (5), wherein the third valve (16) remains below or in the first pressure range (R1) of the fluid in a first switching position (SPa3) opening the third opening (12) and, in the second pressure range (R2) of the fluid, is transitioned from its first switching position (SPa3) into a second switching position (SPb3) closing the third opening (12).

5. The arrangement (2) according to claim 4, wherein the base body (5) has a space (6) divided by a separating element (7) into a first chamber (8) and a second chamber (9), wherein the first chamber (8) is permanently connected in a fluid-conducting manner to the fourth opening (13), designed to introduce the fluid into the base body (5), while at least the first opening (10) is connected in a fluid-conducting manner to the second chamber (9) by the first valve (14) associated therewith, and at the same time or alternately the second opening (11) is connected in a fluid-conducting manner to said second chamber by the second valve (15) associated therewith.

6. The arrangement according to claim 5, wherein at least one of the valves (14-16) has a valve body (14a-16a) that is movably mounted in the separating element (7) by a retaining diaphragm (14b-16b) that seals the two chambers (8, 9) against one another.

7. The arrangement according to claim 6, wherein the valve body (14a-16a) is coupled to a drive diaphragm (14c-16c) arranged within the first chamber (8), wherein the drive diaphragm (14c-16c) has, relative to the retaining diaphragm (14b-16b), a larger surface area that can be charged with pressure of the fluid to be conducted.

8. The arrangement according to claim 5, further comprising a check valve (17) arranged within the second chamber (9), which check valve is designed to allow the flow of the introduced into the base body (5) via the fourth opening (13) and through the third valve (12), located in its second switch position (SPb3), into the second chamber (9) toward the second valve (15), and to block a backflow from the second chamber (9) toward the fourth opening (13).

9. The arrangement according to claim 4, wherein the first switching position (SPa3) of the third valve (16), the first chamber (8) and the second chamber (9) are separated from one another in a fluid-tight manner, while, in the second switching position (SPb3) of the third valve (16), the first chamber (8) and the second chamber (9) are connected to one another in a fluid-conducting manner.

10. The arrangement according to claim 4, wherein at least one of the valves (14-16) is held in one of its possible positions by a spring element (14d-16d), and can be changed into its other possible position in the first pressure range (R1) or/and in the second pressure range (R2) of the fluid only against a restoring force of the spring element (14d-16d).

11. A manipulation system (1) comprising an arrangement (2) according to claim 1, as well as a pump (3) that is connected in a fluid-conducting manner to a fourth opening (13) of the base body (5) of the arrangement (2), wherein the fluid actuator (4), preferably an expansion body, is connected in a fluid-conducting manner to a second opening (11) of the base body (5) of the arrangement (2).

12. A method for manipulating the flow of a fluid with a manipulation system (1) comprising an arrangement (2) according to claim 1, as well as a pump (3) that is connected in a fluid-conducting manner to a fourth opening (13) of the base body (5) of the arrangement (2), wherein the fluid actuator (4), preferably an expansion body, is connected in a fluid-conducting manner to a second opening (11) of the base body (5) of the arrangement (2), wherein at least one means (14-16), preferably a valve, provided for establishing and/or interrupting a fluid-conducting connection between the openings (10-13) of the base body (5) of the arrangement (2) is charged with the fluid to be conducted and is actuated depending on a pressure value of the fluid that can be adjusted via the pump (3), wherein to forward the fluid, introduced into the base body (5) via the pump (3) of the arrangement (2) through a fourth opening (13) of said base body (5) of the arrangement (2), into the fluid actuator (4), the pressure of the fluid is increased, by increasing the power of the pump (3), until a pressure value in a second pressure range (R2) is achieved, in order to close both a first opening (10) of the base body (5) by means of a first valve (14) and a third opening (12) of the base body (5) by means of a third valve (16), with simultaneous establishment of a fluid-conducting connection between the two chambers (8, 9) of the base body (5), while a second valve (15) is opened by the fluid that is then applied to said second valve at a pressure value in the second pressure range (R2), and the fluid flows through a second opening (11) of the base body (5) into the fluid actuator (4).

13. The method according to claim 12, wherein to hold the fluid introduced into the fluid actuator (4), the first opening (10) of the base body (5) is opened by the first valve (14); and the second opening (11) of the base body (5), which second opening is connected in a fluid-conducting manner to the fluid actuator (4), is closed by the second valve (15), and the third opening (12) of the base body (5) is closed by the third valve (16), with simultaneous interruption of a fluid-conducting connection between the two chambers (8, 9) of the base body (5) in that the pressure of the fluid is decreased by means of a power reduction of the pump (3) to a pressure value below a first pressure range (R1).

14. The method according to claim 13, wherein to at least partially discharge the fluid present in the fluid actuator (4) via the first opening (10) of the base body (5), both the first valve (14) and the third valve (16) of the third opening (12) are opened as required with simultaneous interruption of a fluid-conducting connection between the two chambers (8, 9) of the base body (5); and the second valve (15) of the second opening (11) of the base body (5), which second opening is connected in a fluid-conducting manner to the fluid actuator (4), is opened in that the pressure of the fluid is lowered, by means of a power reduction of the pump (3), from a pressure value in the second pressure range (R2) to a pressure value in the first pressure range (R1), or is raised, by means of a power increase of the pump (3), to a pressure value in the first pressure range (R1).

\* \* \* \* \*